(12) United States Patent
Gill

(10) Patent No.: US 7,965,322 B2
(45) Date of Patent: Jun. 21, 2011

(54) COLOR CORRECTION ON AN IMAGE

(75) Inventor: Christopher P. Gill, Hants (GB)

(73) Assignee: Nokia Corporation, Espoo (FI)

( * ) Notice: Subject to any disclaimer, the term of this patent is extended or adjusted under 35 U.S.C. 154(b) by 673 days.

(21) Appl. No.: 12/150,321

(22) Filed: Apr. 25, 2008

(65) Prior Publication Data

US 2009/0268044 A1 Oct. 29, 2009

(51) Int. Cl.
*H04N 9/73* (2006.01)
*H04N 9/083* (2006.01)
*G06K 9/00* (2006.01)

(52) U.S. Cl. ............... 348/223.1; 348/280; 382/167

(58) Field of Classification Search ............... 348/223.1, 348/224.1, 222.1, 225.1, 272, 280; 382/162, 382/167
See application file for complete search history.

(56) References Cited

U.S. PATENT DOCUMENTS

| | | | |
|---|---|---|---|
| 3,922,711 A | 11/1975 | Sasabe et al. | 358/75 |
| 5,446,504 A * | 8/1995 | Wada | 348/645 |
| 6,630,956 B1 * | 10/2003 | Toi | 348/223.1 |
| 6,963,362 B1 * | 11/2005 | Nakayama | 348/224.1 |
| 2003/0030648 A1 * | 2/2003 | Baer | 345/589 |
| 2006/0215034 A1 * | 9/2006 | Nakabayashi et al. | 348/224.1 |
| 2007/0263098 A1 * | 11/2007 | Quan et al. | 348/222.1 |
| 2008/0007657 A1 * | 1/2008 | Sakaguchi et al. | 348/708 |

* cited by examiner

*Primary Examiner* — Nhan T Tran
(74) *Attorney, Agent, or Firm* — Ware, Fressola, Van Der Sluys & Adolphson, LLP

(57) ABSTRACT

A method and apparatus for adjusting the pixel colors of a digital image. After the raw image data from the digital image is white-balanced, the white-balanced image data is conveyed to a color correction module as color vectors in a color space for color adjustment using a color correction matrix. The color adjustment is based on a plurality of base matrices, wherein at least two of the base matrices are different from each other, and a plurality of weighting values, one weighting value for each base matrix. With the base matrices and the weighting values, a correction matrix can be derived from the sum of the base matrices weighted with said weighting values and applied to at least some of the color vectors.

20 Claims, 4 Drawing Sheets

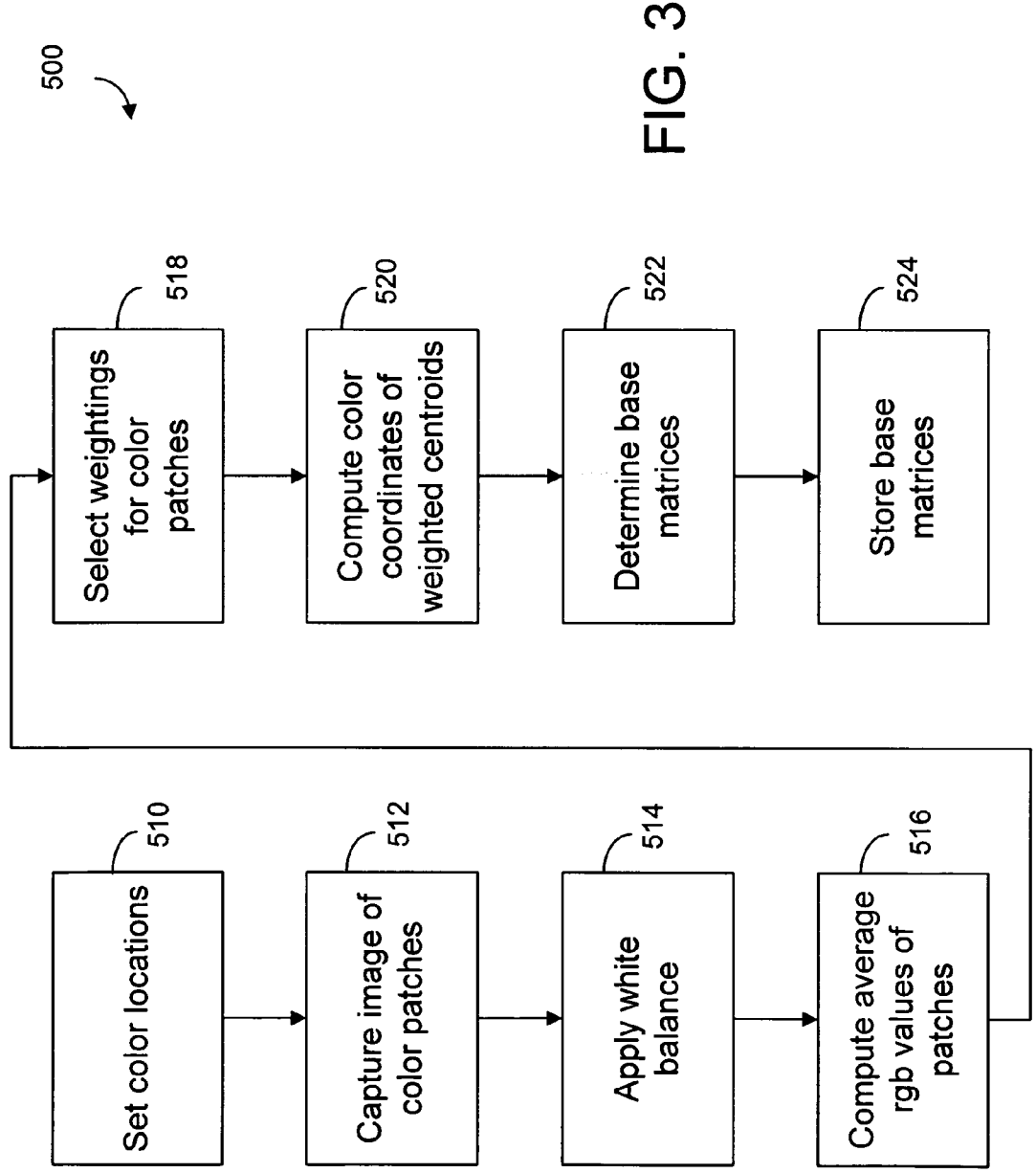

COLOR CORRECTION ON AN IMAGE

FIELD OF THE INVENTION

The present invention relates generally to processing of raw data from a digital image and, more particularly, to color correction on the image.

BACKGROUND OF THE INVENTION

In general, the data captured by a digital camera needs to be processed before it is displayed to the user. For color cameras, the processing commonly includes a white-balance step followed by a color-correction step. The white-balance step mimics the capability of the human brain to adapt to different hues of illumination. The color-correction step is intended to compensate for the differences between how the camera sees the colors and how a human sees the colors. For example, the hue recorded as red by a camera is different from the hue recognized as red by the human brain.

SUMMARY OF THE INVENTION

The present invention provides a method for color correction for use with a digital camera, including a video camera. After an image is captured by an image sensor in the camera, the raw image data is white-balanced and then color corrected.

Thus, the first aspect of the present invention is a method for adjusting one or more colors of an image, wherein the colors are representable by a plurality of color vectors (r, g, b). These color vectors are pixel-color locations in a color space. According to various embodiments of the present invention, the color adjustment is based on 1) a plurality of base matrices, each base matrix associated with a location in the color space, wherein at least two of the base matrices are different from each other, and 2) a plurality of weighting values, one weighting value for each base matrix. With the base matrices and the weighting values, a correction matrix can be derived from the sum of the base matrices weighted with said weighting values and applied to at least some of the color vectors.

According to some embodiments of the present invention, each of the color vectors comprising a plurality of vector components and at least some of the weighting values are a function of at least some of the vector components. Each of the color vectors may comprise a plurality of vector components, the vector components comprise red, green and blue components.

According to one embodiment of the present invention, each of the color vectors is representable by a pixel-color location in a color space, and the method further comprises selecting a plurality of reference locations in the color space associated with the base matrices, wherein the weighting value for said one base matrix is determined based on a distance between the pixel-color location and the reference location associated with said one base matrix in the color space.

According to one embodiment of the present invention, the weighting value is a function of the distance in the color space. The correction matrix can be a function of the color vector on which the correction matrix is applied. According to one embodiment of the present invention, each of the color vectors is a 3-by-1 vector and the color matrix comprises a 3-by-3 matrix having 3 rows of elements, and wherein a sum of each row of elements is equal to unity. According to various embodiments of the present invention, the base matrices are selected according to the lighting condition.

The second aspect of the present invention is an image processing module, which comprises a storage medium for storing a plurality of base matrices, each base matrix associated with a reference location in a color space, wherein at least two of the base matrices are different from each other; and a color correction module for adjusting one or more colors of an image, wherein the colors are representable by a plurality of color vectors in the color space, the color correction module comprising algorithm for determining a plurality of weighting values, one weighting value for each base matrix;

computing a sum of the base matrices weighted with said weighting values for providing a correction matrix indicative of the sum, and applying the correction matrix to at least some of the color vectors.

According to one embodiment of the present invention, the output of an image is raw image data. After the raw image data has been white-balanced, it can be provided to the color correction module for color correction.

The base matrices can be stored in a look-up table or the like.

The third aspect of the present invention is a camera system having an image processing module, according to various embodiments of the present invention.

The fourth aspect of the present invention is an electronic device having a camera system, according to various embodiments of the present invention. The electronic device can be a mobile terminal or the like.

The present invention will become apparent upon reading the description taken in conjunction with FIGS. 1 to 5.

BRIEF DESCRIPTION OF THE DRAWINGS

FIG. 3 is a flowchart showing the steps for determining a plurality of base matrices, according to one embodiment of the present invention.

DETAILED DESCRIPTION OF THE INVENTION

Color correction is generally carried out in a color space. In a color space, a color is identified by using a coordinate system, with parameters representing hue, saturation and brightness, for example. There are a number of different color spaces for use in color correction purposes. The present invention will be disclosed in terms of brightness levels measured by each of the color channels in red, green and blue, for example.

In color correction involving three colors such as red, green and blue (r, g, b), a 3×3 matrix is usually used. For example, if the colors (r, g, b) are represented by a 3×1 vector C, and the color correction matrix is a 3×3 matrix M, then the corrected colors (r', g', b') are represented by a 3×1 vector C' such that $$C' = MC$$

According to various embodiments of the present invention, the color spaced used is the red, green and blue values (RGB) of the color, and color correction is carried out after the raw data from a digital camera has been processed by a white-balance step. White-balance is not part of the invention. Furthermore, the white-balance processed data may have been scaled to fit within the interval $$0 <= r, g, b <= 1$$

for each color channel of a pixel.

According to various embodiments of the present invention, the color correction matrix M is a weighted sum of a plurality of base matrices $M_j$'s, wherein each matrix $M_j$ is corresponding to one of the colors to be identified by the locations in a color space. In general, the locations identified in the color space are denoted by c1, c2, ... cn (n>=2). Each identified location cj is assigned to a base matrix $M_j$ of size 3×3, for example, and at least two base matrices are different.

An exemplary base matrix $M_j$ is shown below:

$$M_j = \begin{pmatrix} 1 - a_{12,j} - a_{13,j} & a_{12,j} & a_{13,j} \\ a_{21,j} & 1 - a_{21,j} - a_{23,j} & a_{23,j} \\ a_{31,j} & a_{32,j} & 1 - a_{31,j} - a_{32,j} \end{pmatrix},$$

where $a_{nm}$'s are coefficients the values of which can be fitted to a plurality of functions in order to cover an entire color space, or they are functions of j. These functions, in turn, give the color correction matrix to be used for correcting any given point in the color space, or a subset of points in the color space, or the points in color space in a selected image area. In each base matrix $M_j$ as shown above, the sum of each row of coefficients is equal to 1. The coefficients $a_{nm}$'s can vary with the lighting, for example. When a picture is taken with an electronic flash, its color may be too blue. It is possible to use the coefficients to reduce the b value in a pixel, for example.

Figure 4:
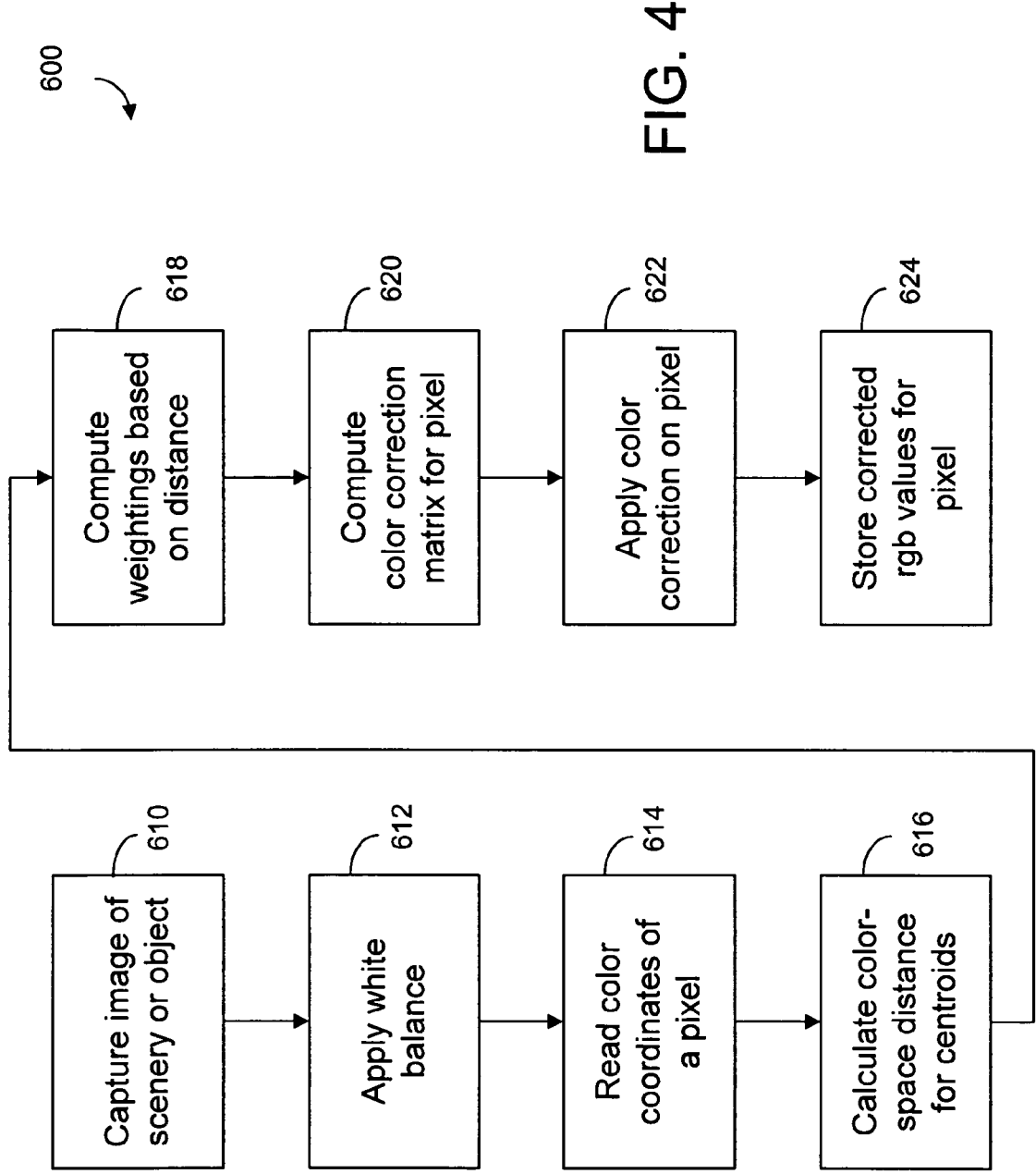
FIG. 4 is a flowchart showing the steps for image signal processing, according to one embodiment of the present invention.

The determining of the base matrix $M_j$ is illustrated in a flowchart as shown in FIG. 3, and the derivation of the color correction matrix M is illustrated in a flowchart as shown in FIG. 4.

Figure 1:
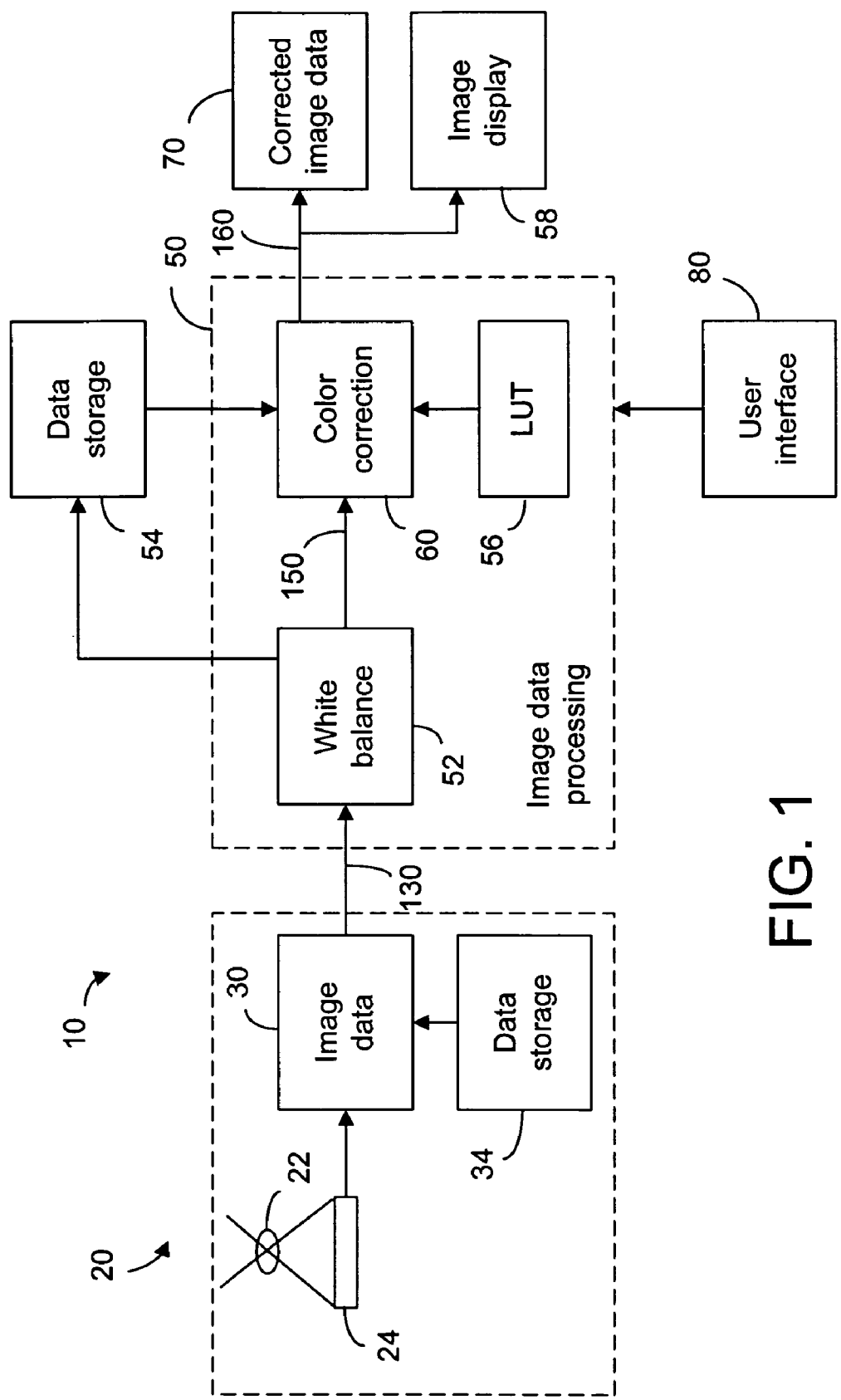
FIG. 1 is a block diagram showing an image capturing and processing system, according to one embodiment of the present invention.

FIG. 1 illustrates a camera system, according to one embodiment of the present invention. As shown in FIG. 1, the camera system 10 comprises a camera module 20 and an image signal processing module 50 adapted to receive raw image data 130 from an image-data storage 30 in the camera module 20 or a separate data storage 34. The camera module 20 can be a digital camera with an imaging lens 22 for forming an image on an image sensor 24. The raw image data 130 is processed by a white balance module 52 to become white-balance processed data 150. The white-balance processed data 150 can be directly provided to a color correction module 60 for color adjustment. Alternatively, the white-balance process data is stored in a data storage 54 so that color correction can be performed in a different time and/or in a separate color correction module. The output of the color correction module 60 is the color-corrected image data 160 which can be stored in a data storage 70 and provided to a display 58 so as to allow a user to see an image of a scene before and after image capturing. The image signal processing correction system or module 50 further comprises a look-up table (LUT), such as a hashed LUT 56 for storing a plurality of base matrices $M_j$'s so that the color correction matrix M can be computed for color correction when needed. For example, whenever a user takes a picture, the image data of the picture is white balanced and color corrected. The color correction matrix M is derived, based on the stored $M_j$'s, for each set of color coordinates (r, g, b) in the white-balanced image data. Furthermore, even when the image data is only displayed to allow a user to see the scene before taking a picture, it is also preferable to apply color correction to the image data to be displayed. The camera system 10 may include a user interface 80 to allow the user to partially control the image processing processes. For example, a user may change the color of a picture as if the picture is taken under a different lighting condition. The interface can be used for selecting a picture taking mode, such as a snow-scene mode, a portrait mode, etc.

Figure 2:
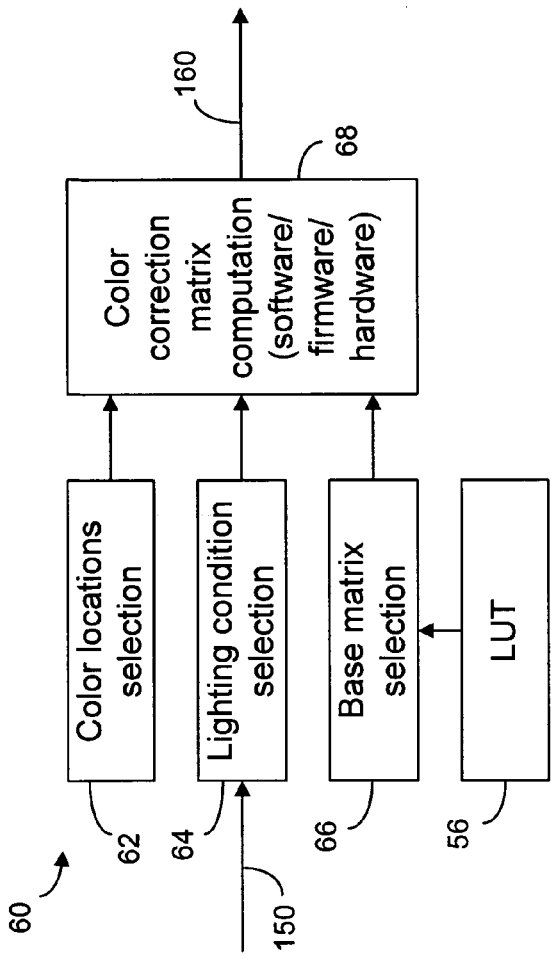
FIG. 2 is a block diagram showing the components in the color correction module, according to one embodiment of the present invention.

As shown in FIG. 2, the color correction module 60, according to one embodiment of the present invention, comprises a color location selection module 62, a lighting selection module 64, a base matrix selection module 66, and a color correction matrix computation module 68. For example, the color location selection module 62 can be used to select the color locations c1, c2, c3 and c4. In one embodiment of the present invention, the color locations are predetermined. In another embodiment of the present invention, a user is allowed to select the number of color locations. If the number of color locations is two, then only two base matrices $M_j$'s are used to derive the color correction matrix M, for example. The lighting selection module 64 is used to identify the lighting condition. For example, if the lighting condition is daylight, then a set of $M_j$'s for the daylight will be used to derive the color condition matrix M. This specified set of $M_j$'s will be selected from the LUT 56, for example.

The color correction matrix computation module 68, in one embodiment of the present invention, comprises a software program embodied in a computer readable storage device, such as a memory chip or a flash memory card. The software program has programming codes to carry out the computation steps as illustrated in the flowchart 600 in FIG. 4, for example. In different embodiments of the present invention, the color correction matrix computation algorithm can be implemented in a firmware or hardware.

As disclosed above, the color correction matrix M is a weighted sum of a plurality of base matrices $M_j$'s. FIG. 3 is a flowchart illustrating the steps for determining the base matrices $M_j$'s. As shown in the flowchart 500, a number of color locations as c1, c2, c3 and c4 are selected at step 510. For example, the color locations are selected as red, green, blue and gray locations in a color space. At step 512, a number of color patches from a color chart are selected and recorded, for example. Some of the patches are more red in apparent, some are more green in apparent, etc. For example, 24 color patches are captured from the color chart and the average brightness or rgb value of each patch is computed at step 516 after the patch image data or white-balanced at step 514. Let us denote the average rgb value for each patch as (r'k, g'k, b'k), where k=1, 2, 3, ..., 24. Among these k patches, patches 9, 15 and 17 are more red in apparent; patches 4, 11, 14 and 16 are more green in apparent; patches 3, 5, 13 and 18 are more blue in apparent; and patches 20, 21, 22 and 23 are more gray in apparent. At step 518, the weightings of the color patches are selected or determined so that the color coordinates of weighted centroids can be computed. Each of the weighted centroids is corresponding to one color location. For example, the selected color locations are c1, c2, c3 and c4 and the RGB color-space coordinates of each color location or centroid ci are denoted as (ri, gi, bi), where i=1, 2, 3, 4 in this example. In one embodiment of the present invention, the color-space coordinates of the centroids are computed from the average rgb values of the color patches by weighted averaging at step 520. Let us denote the color-space coordinates of $$rj = \Sigma wjrk * r'k / \Sigma wjrk, k=1, 2, 3, \ldots, 24$$

$$gj = \Sigma wjgk * g'k / \Sigma wjgk, k=1, 2, 3, \ldots, 24$$

$$bj = \Sigma wjbk * b'k / \Sigma wjbk, k=1, 2, 3, \ldots, 24$$

where wjrk, wjgk and wjbk are the weights given to red coordinate r'k, the green coordinate g'k, and blue coordinate b'k of the kth patch when computing the color-space coordinates of the color location cj. The weights wjrk, wjgk and wjbk are selected at step 518. For simplicity, let wjrk=wjgk=wjbk=wjk, and we have $$rj = \Sigma wjk * r'k / \Sigma wjk, k=1, 2, 3, \ldots, 24$$

$$gj = \Sigma wjk * g'k / \Sigma wjk, k=1, 2, 3, \ldots, 24$$

$$bj = \Sigma wjk * b'k / \Sigma wjk, k=1, 2, 3, \ldots, 24$$

As an example, we assign:
for j=1 (red location)
  wjk=2, k=9, 15, 17
    1, all other patches;
for j=2 (green location)
  wjk=2, k=4, 11, 14, 16
    1, all other patches;
for j=3 (blue location)
  wjk=2, k=3, 5, 13, 18
    1, all other patches; and
for j=4 (gray location)
  wjk=2, k=20, 21, 22, 23
    1, all other patches.

The base matrices $M_j$'s and their coefficients $a_{nm}$'s are determined at step 522 and are stored in an LUT at step 524, for example. The determining steps will be described later. In various embodiments of the present invention, the base matrices $M_j$'s are different for different lighting conditions. For example, the base matrices $M_j$'s for daylight (D65 lighting) and for indoor (D30 lighting) are different.

FIG. 4 is a flowchart that illustrates how color correction is carried out, according to one embodiment of the present invention. As shown in the flowchart 600, under a certain lighting condition, an image is captured at step 610. The raw image data is white-balanced at step 612. At step 614, the color coordinates (r, g, b) in an RBG color-space, for example, are read. At step 616, the color-space distance Sj between the color coordinates (r, g, b) and each of the color location cj is computed as follows:

$$Sj = \text{sqrt}[(r-rj)^2 + (g-gj)^2 + (b-bj)^2], j=1, 2, 3, 4$$

At step 618, the weightings for the base matrices $M_j$'s, according to one embodiment of the present invention, are computed as follows:
  dj=1/Sj if Sj>0 for j=1, 2, 3 and 4
  1 for those Sj=0, and 0 for all others
  1 if Sj=0 for all j's At step 620, the color correction matrix M for the pixel having the color coordinates or brightness values of (r, g, b) is computed as follows:

$$M = \Sigma dj * Mj / \Sigma dj, j=1, 2, 3, 4$$

At step 622, the color of the pixel having the color coordinates (r, g, b) is corrected by using the color correction matrix M. For example, if the colors (r, g, b) are represented by a 3×1 vector C, and the color correction matrix is a 3×3 matrix M, then the corrected colors (r', g', b') are represented by a 3×1 vector C' such that $$C' = MC$$

At step 624, the corrected colors are stored.

As can be seen from step 616 above, Sj is a function of (r, g, b). Thus, in general, the color correction M is color-dependent. In a color image with each of the r, g, b values having a resolution of n bits, there can be up to $2^{(3n)}$ different M's. In one embodiment of the present invention, the color-dependent color correction matrices M's for an image are computed as part of image signal processing when an image is captured. In another embodiment of the present invention, the color correction matrices M's are stored in a look-up table (LUT) or the like such that a suitable M is fetched from the LUT according to a point in the color space.

In the above described embodiment, the weight dj, in general, is derived from the color-space distance Sj. Thus the color correction matrix M is a weighted sum of a plurality of base matrix $M_j$'s wherein each of the weights can be a function of the distance Sj for all color locations c1, c2, c3 and c4. However, the weight can be derived differently. For example, each or some of the weights can be derived from the square of Sj.

The image signal processing steps 610 to 622 in the flowchart 600 can be used to determine the base matrices $M_j$'s at step 522 of the flowchart 500 (see FIG. 3). For example, a set of initial base matrices $M_j$'s are chosen for the computation of color correction matrix M. Furthermore, one color channel is used to estimate the coefficients $a_{nm}$'s. For example, it is possible to use one color channel r to compute the color-space distance Sj and the weight dj for each of the initial base matrices $M_j$'s. A color matrix M for correcting the single color r can then be derived from the weightings and the initial base matrices according to step 620 in the flowchart 600. The coefficients $a_{nm}$'s related to the single color r can be estimated and refined.

The same procedure can be used to estimate the coefficients $a_{nm}$'s related to the single color g and to estimate the coefficients $a_{nm}$'s related to the single color b. It is also possible to use two color channels such as (r, g, 0), (r, 0, b) and (0, g, b) and all color channels (r, g, b) to further refine the coefficients $a_{nm}$'s. By iteration as many times as needed until the result is satisfactory, a set of base matrices $M_j$'s are determined at step 522 and stored at step 524. Different sets of base matrices $M_j$'s for various lighting conditions can be computed in a similar fashion. According to various embodiments of the present invention, more or less than 4 base matrices $M_j$ can be used to compute the color correction matrix M.

It should also be noted that more than one color correction matrices M may be used to adjust the colors in different locations of an image. For example, one color correction matrix is used to adjust the colors of the pixels within a circle around a central point of the image and another color correction matrix is used to adjust the colors outside the circle. Alternatively, there are two or more concentric rings to define the boundaries of the image areas in which a certain color correction matrix M is used to adjust the colors. It is possible to partition an image differently. For example, an image can be partitioned into an upper part and a lower part for color correction purposes.

In the above-given examples, Sj is a function of (r, g, b), and at least some of the dj's are also a function of (r, g, b) or dj(r, g, b). It is possible that $$M(r, g, b) = \Sigma dj(r, g, b) * Mj/\Sigma dj(r, g, b), j=1,2,3,4$$

Thus, the color correction matrix M can be a function of the color vectors (r, g, b).

Furthermore, the summation can be carried out differently. For example, the weighting values dj(r, g, b) can be modified such that $$M(r, g, b) = \Sigma [dj(r, g, b)]^{1.01} * Mj/\Sigma dj(r, g, b), j=1, 2, 3, 4$$

Moreover, the color correction matrix M can also have an adjustment matrix that is not associated with a color location cn and is not weighted by a color-dependent dj(r, g, b), such as $$M(r, g, b) = \{\Sigma dj(r, g, b) * Mj/\Sigma dj(r, g, b)\} + Mc, j=1,2,3,4$$

where Mc is a 3×3 matrix.

In general, while the coefficients $a_{nm,j}$'s are obtained by a calibration procedure for a given image sensor by using a color chart, for example, they are not color-vector dependent. However, they can also be a function of (r, g, b) as follows:

$$a_{nm,j} = f(n, m, j) \times g(r, g, b).$$

In sum, the present invention provides a method for adjusting one or more colors of an image, wherein the colors are representable by a plurality of color vectors (r, g, b). These color vectors are color locations in a color space. According to various embodiments of the present invention, the color adjustment is based on 1) a plurality of base matrices, wherein at least two of the base matrices are different from each other, and 2) a plurality of weighting values, one weighting value for each base matrix. With the base matrices and the weighting values, a correction matrix can be derived from the sum of the base matrices weighted with said weighting values and applied to at least some of the color vectors.

According to some embodiments of the present invention, each of the color vectors comprising a plurality of vector components and at least some of the weighting values are a function of at least some of the vector components. Each of the color vectors may comprise a plurality of vector components, the vector components comprise red, green and blue components.

According to one embodiment of the present invention, each of the color vectors is representable by a pixel-color location in a color space, and the method further comprises selecting a plurality of reference-color locations in the color space, one reference-color location associated with one of the base matrices, wherein the weighting value for said one base matrix is determined based on a distance between the pixel-color location and the reference-color location associated with said one base matrix in the color space.

According to one embodiment of the present invention, the weighting value is a function of the distance in the color space. The correction matrix can be a function of the color vector on which is the correction matrix applied. According to one embodiment of the present invention, each of the color vectors is a 3-by-1 vector and the color matrix comprises a 3-by-3 matrix having 3 rows of elements, and wherein a sum of each row of elements is equal to unity. According to various embodiments of the present invention, the base matrices are selected according to the lighting condition.

The present invention also provides an image processing module, which comprises a storage for storing a plurality of base matrices, wherein at least two of the base matrices are different from each other; and a color correction module for adjusting one or more colors of an image, wherein the colors are representable by a plurality of color vectors, the color correction module comprising algorithm for determining a plurality of weighting values, one weighting value for each base matrix;

computing a sum of the base matrices weighted with said weighting values for providing a correction matrix indicative of the sum, and applying the correction matrix to at least some of the color vectors.

According to one embodiment of the present invention, the output of an image is raw image data. After the raw image data has been white-balanced, it can be provided to the color correction module for color correction.

The base matrices can be stored in a look-up table or the like.

The image processing module, according to various embodiments of the present invention, can be used in a camera or camera system 10 as shown in FIG. 1. The camera system 10 can be used to take one picture at a time or a series of pictures such as those in a video camera. Furthermore, the camera system 10 can be implemented in an electronic device, such as a mobile terminal as shown in FIG. 5.

Figure 5:
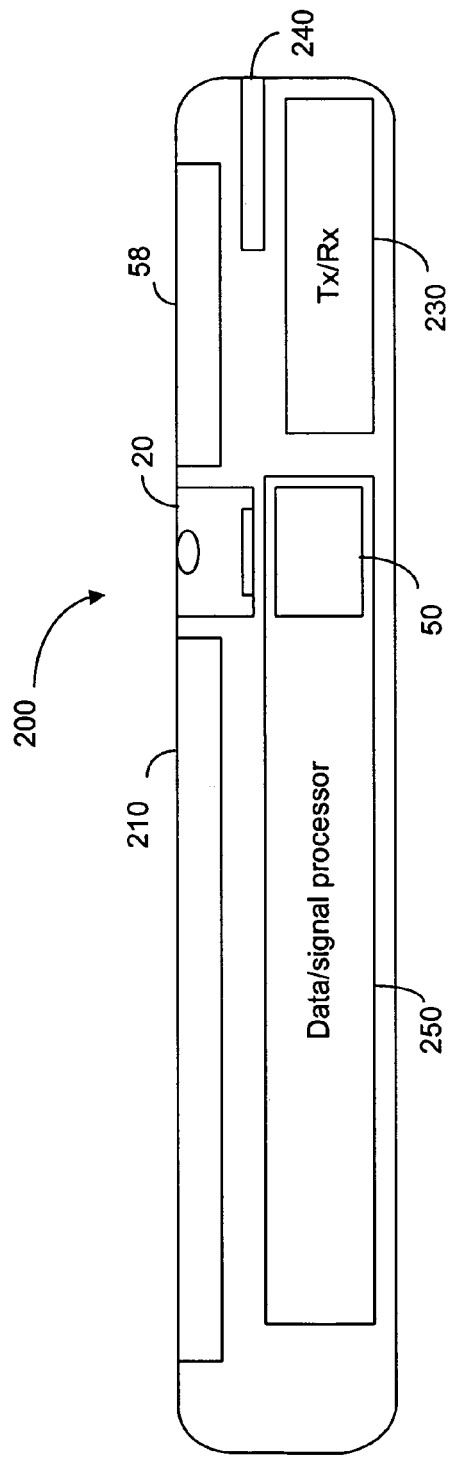
FIG. 5 is a block diagram showing an electronic device, such as a mobile terminal, according to one embodiment of the present invention.

As shown in FIG. 5, the electronic device or mobile terminal 200 comprises a transceiver 230 connected to an antenna 240 for transmitting and receiving communications signals, including image signals. The mobile terminal 200 has a data/signal processor 250 for processing received data and data to be transmitted. The data/signal process 250 may include an image signal processor 50 for processing image data from the camera 20. The mobile terminal 200 also has a keyboard 210 to allow a user to input information and a display 56 for displaying text and images, for example. The electronic device can be a communicator device, a digital personal assistant or the like.

Thus, although the present invention has been described with respect to one or more embodiments thereof, it will be understood by those skilled in the art that the foregoing and various other changes, omissions and deviations in the form and detail thereof may be made without departing from the scope of this invention.

What is claimed is:

1. A method for adjusting one or more colors of an image in an imaging apparatus, wherein the colors are representable by a plurality of color vectors, said method comprising:

selecting a plurality of base matrices, each base matrix associated with a reference location in a color space, wherein at least two of the base matrices are different from each other;

determining a weighting value for each base matrix;

computing a sum of the base matrices weighted with said weighting values for obtaining a correction matrix indicative of the sum; and applying the correction matrix to at least some of the color vectors, wherein each of the color vectors comprising a plurality of vector components and at least some of the weighting values are a function of at least some of the vector components.

2. The method of claim 1, wherein each of the color vectors comprises a plurality of vector components, the vector components comprise red, green and blue components.

3. The method of claim 1, wherein each of the color vectors is representable by a pixel-color location in a color space, said method further comprising:
determining a distance between the pixel-color location and the reference location associated each of the selected base matrices in the color space, wherein the weighting value is a function of the distance.

4. The method of claim 3, wherein the weight value decreases as the distance increases.

5. The method of claim 1, wherein the correction matrix is a function of the color vector on which the correction matrix is applied.

6. The method of claim 1, wherein each of the color vectors is a 3-by-1 vector and the color matrix comprises a 3-by-3 matrix having 3 rows of elements, and wherein a sum of each row of elements is equal to unity.

7. The method of claim 1, wherein the image is a captured under a lighting condition and wherein the base matrices are associated with the lighting condition.

8. The method of claim 1, wherein the correction matrix is used for adjusting the color vectors only in a section of the image.

9. The method of claim 8, further comprising:
computing a different correction matrix for applying to the color vectors in a different section of the image.

10. An image processing module, comprising:
a storage medium for storing a plurality of base matrices, each base matrix associated with a reference location in a color space, and
a color correction module for adjusting one or more colors of an image, wherein the colors are representable by a plurality of color vectors, the color correction module adapted for:
selecting two or more base matrices, wherein at least two of the selected base matrices are different from each other,
determining a weighting value for each base matrix;
computing a sum of the base matrices weighted with said weighting values for obtaining a correction matrix indicative of the sum, and
applying the correction matrix to at least some of the color vectors,
wherein each of the color vectors comprising a plurality of vector components and at least some of the weighting values are a function of at least some of the vector components.

11. The image processing module of claim 10, wherein the colors of an image are provided to the color correction module in a form of image data, the image data indicative of white-balanced raw data from the image.

12. The image processing module of claim 10, wherein the storage medium comprises a look-up table for storing the base matrices.

13. The image processing of claim 10, wherein the correction matrix is a function of the color vector on which the correction matrix is applied.

14. The image processing of claim 10, wherein the image is a captured under a lighting condition and wherein the selected base matrices are associated with the lighting condition.

15. The image processing of claim 10, wherein the correction matrix is used for adjusting the color vectors only in a section of the image, and wherein the color correction module is adapted for obtaining a different correction matrix for applying to the color vectors in a different section of the image.

16. A camera, comprising
an image processing module of claim 10, and
a camera module for acquiring the image.

17. The camera of claim 16, further comprising:
a white-balance processing module, wherein the camera module comprises an image sensor, and an optical image forming module for forming the image on the image sensor, wherein the image sensor is adapted for providing raw image data to a white-balance processing module, said white-balance processing module adapted to provide data indicative of the color vectors.

18. An apparatus, comprising:
a communication module adapted for transmitting and receiving signals;
an image capturing module adapted for taking pictures and for providing image data from the pictures; and
an image processing module according to claim 10 for color correcting the image data.

19. The apparatus of claim 18, wherein the communication module is also adapted for transmitting the color-corrected image data.

20. The apparatus of claim 19, comprising a mobile terminal.

* * * * *